United States Patent [19]

Gray

[11] Patent Number: 4,738,014
[45] Date of Patent: Apr. 19, 1988

[54] APPARATUS FOR MOVING PLATE FIN COILS FROM STATION TO STATION

[75] Inventor: Kenneth P. Gray, Syracuse, N.Y.

[73] Assignee: Carrier Corporation, Syracuse, N.Y.

[21] Appl. No.: 944,488

[22] Filed: Dec. 22, 1986

[51] Int. Cl.⁴ ............................................. B21D 53/02
[52] U.S. Cl. ........................... 29/157.3 C; 29/157.3 R; 29/727
[58] Field of Search ............... 29/726, 727, 771, 822, 29/823, 33 G, 157.3 C, 157.3 R; 414/226

[56] References Cited

U.S. PATENT DOCUMENTS

| | | | |
|---|---|---|---|
| 3,824,668 | 7/1974 | Wightman | 29/727 |
| 4,547,963 | 10/1985 | Ohmstede | 29/726 |
| 4,584,751 | 4/1986 | Gray et al. | 29/727 |
| 4,584,765 | 4/1986 | Gray | 29/727 |
| 4,631,813 | 12/1986 | Daniels et al. | 29/727 |

Primary Examiner—Howard N. Goldberg
Assistant Examiner—Irene Cuda
Attorney, Agent, or Firm—Robert H. Kelly

[57] ABSTRACT

A method and apparatus for supporting a partially formed plate fin heat exchanger at a tension expansion station and for moving the heat exchanger into and out of the expander station.

5 Claims, 3 Drawing Sheets

APPARATUS FOR MOVING PLATE FIN COILS FROM STATION TO STATION

BACKGROUND OF THE INVENTION

This invention relates generally to heat exchanger coils and, more particularly, to an apparatus for transporting long plate fin heat exchanger coils between stations during production.

A plate fin heat exchanger coil is commonly constructed with a plurality of flat, parallel plates having laterally spaced holes therein for receiving refrigerant tubes, or hairpin tubes, therein. At each end of the plate fin bundle, there is a tube sheet composed of heavier material, and adjacent one of the tube sheets, generally the upper tube sheet, the open ends of the hairpin tubes are fluidly connected by way of U-shaped return bends that are secured thereto by way of soldering, brazing, or the like. When the coils are installed into a refrigeration system, the refrigerant is made to flow through the hairpin tubes, and the air to be cooled or heated is made to flow over the plate fins, such that a heat transfer is thereby affected.

Typically, the production of plate fin coils involves manual assembly and transport. Small coils are lifted by hand and large coils are moved between stations by crane. The use of cranes is time consuming and clumsy, but tends to protect the delicate fins from damage, since lifting is done by the tube sheets. Conveyors would work for short distances and short coils, but fins tend to sag onto the conveyor in longer coils.

In U.S. Pat. No. 4,228,573 which issued to Barnard, there is disclosed an automated machine for manufacturing fin plate heat exchangers of the type suitable for use in air conditioning systems. Each unit, as it is being assembled, is retained within a holding fixture with the tube receiving holes of the retained fin pack being supported in a generally horizontal position. Initially, the perforated fins and one perforated tube sheet or header are placed in the fixture and then clamped in place using a pair of jaws that are adapted to swing upwardly into locking engagement against the perforated end faces of the partially assembled unit. The fixture is then passed through a series of processing stations wherein the hairpins are laced into the package, a second header is inserted over the laced tube ends and finally the tubes are expanded into locking contact against the surrounding elements.

The fixtures containing the retained units in the Barnard device are carried between processing stations on a conveyor belt. At each processing station, the fixture is lifted from the belt and carried to a remote position wherein a specific manufacturing step is carried out. Upon the completion of the operation, the fixture is again returned to the conveyor belt and moved to the next subsequent station. Because of the inherent weight of the heat exchangers, they tend to sag in the middle and the fins are damaged as they rub against the conveyor. Further, the timing of the various operational steps in Barnard is not coordinated and, in order to avoid bottlenecks along the line, fixtures containing partially assembled units are moved to temporary overhead storage areas where they are held until needed. As a consequence, each fixture must be loaded and unloaded from the main conveyor a number of times before the assembly operation is completed. This excessive handling slows down the automated process and raises the unit cost of the assembled units. The apparatus needed to carry out the many handling and processing steps is also relatively complex and difficult to maintain.

A further disadvantage associated with the Barnard machine concerns the excessive handling of the coils. During a number of assembly operations, the clamps must be lowered so that the operation can be completed. This, of course, releases the unit from the fixture at a time when it is being worked upon. As a consequence the fin plates can become misaligned or damaged and, as a consequence, the unit may eventually have to be scrapped.

It should be noted that in Barnard, at each station, the coils are lifted by a crane and held in a predetermined position while the operation at the station is performed.

Thus, there is a clear need for a conveyor system for moving coils from one location to another during assembly that provides quick and accurate coil location at various stations while protecting the coil from damage and provides an apparatus for supporting and moving the coil while at a processing station.

SUMMARY OF THE INVENTION

It is an object of the present invention to improve the apparatus for manufacturing plate fin heat exchangers.

It is another object of the present invention to minimize the number of handling operations required to automatically assemble a plate fin heat exchanger.

It is a further object of the present invention to support a fin pack unit by its tube sheets during movement between assembly stations and within an automated assembling machine.

A still further object of the present invention is to reduce fin damage during the manufacture of a plate fin heat exchanger particularly during movement between assembly stations.

These and other objects of the present invention are attained by means of a conveyor apparatus for moving coils between manufacturing stations, and at any particular station providing a locating means for quickly and accurately positioning the coil at the station, and providing a support means at the expanding station to level a sagging coil and a clamping means to hold the tube sheet during tension expansion.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

Other objects and advantages of the present invention will be apparent from the following detailed description in conjunction with the accompanying drawings, forming a part of this specification, and in which reference numerals shown in the drawings designate like or corresponding parts throughout the same, and in which.

DESCRIPTION OF THE PREFERRED EMBODIMENT

Figure 1:
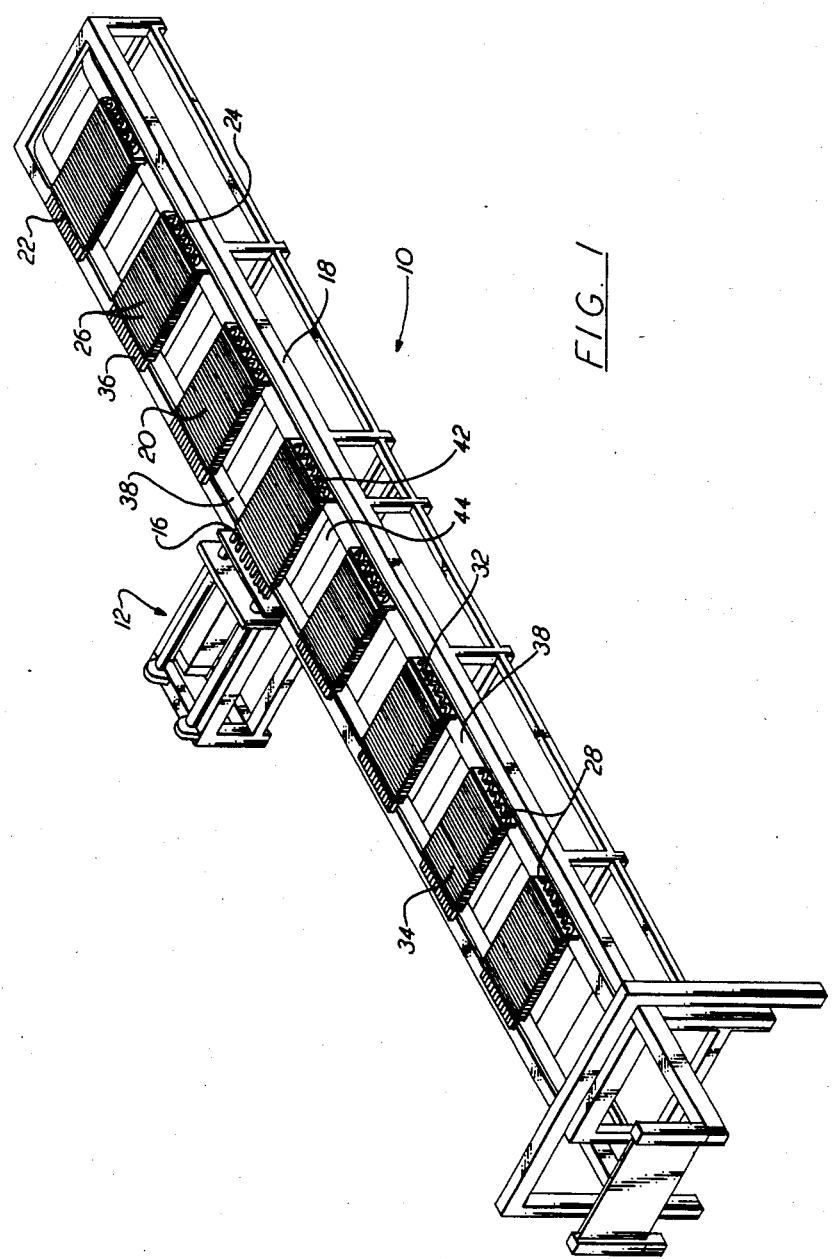
FIG. 1 is a perspective view of the apparatus embodying the teachings of the present invention.

Referring to FIG. 1, there is shown a portion of a plate fin heat exchanger assembly system 10 with the various components used in accordance with the method and apparatus of the present invention. The present plate fin coil conveyer is described in connection with expander station 12 and has a pair of parallel conveyor means 38—38, e.g. roller conveyors. Prior to arriving at the expander station 12, the plate fin heat exchangers 20 are partially assembled at a lacing station (not shown). As may be seen a plate fin heat exchanger has a plurality of fins 26, a bottom tube sheet 24 and a top tube sheet 22. Hairpin tubes 28 are arranged having a bend end portion 32 and leg portions 34 such that the leg portions extend through the entire fin bundle and tube sheet 24 to tube sheet 22 and extend beyond tube sheet 22 defining extension portions 36. The hairpin tubes are physically inserted or laced through arranged openings in the fins and tube sheets into the positions as shown.

Additionally shown in FIG. 1, the expander station 12 includes a plurality of bullet rods 16 which are actuated by a suitable means, e.g. a hydraulic power source for displacing an equalizer bar connected to the bullet rods, to pass the bullet rods 16 through the entire heat exchanger. Under action of the bullet rods the tube walls are expanded outwardly in a radial direction to lock the tube against the fins and tube sheets. Generally, one bullet rod corresponds to each leg portion of the hairpin tube such that all of the tubes are simultaneously expanded. Moreover, at the expander station 12, or other stations in the assembly process, e.g. a separate belling station, a laterally adjustable carriage 42 is mounted on assembly platform 18. The carriage moves on rail 44 to allow for different heat exchanger lengths, and to permit compression of the fins 26 and tube sheets 22, 24 as necessary.

Figure 3:
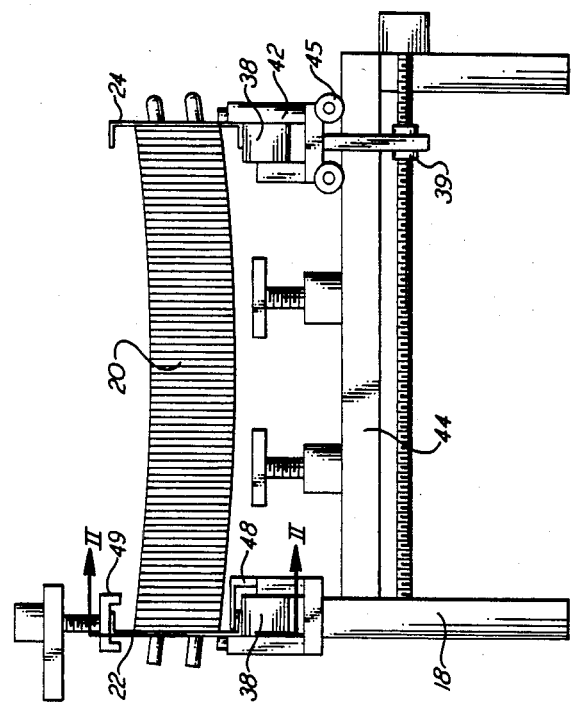
FIG. 3 is a side elevational view of an expanding station illustrated in FIG. 2 showing a long coil unit prior to expansion.
Figure 2:
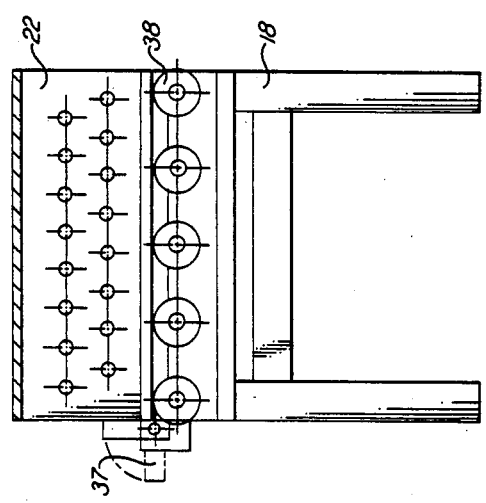
FIG. 2 is a partial front elevation of an expanding station embodying the teachings of the present invention.
Figure 4:
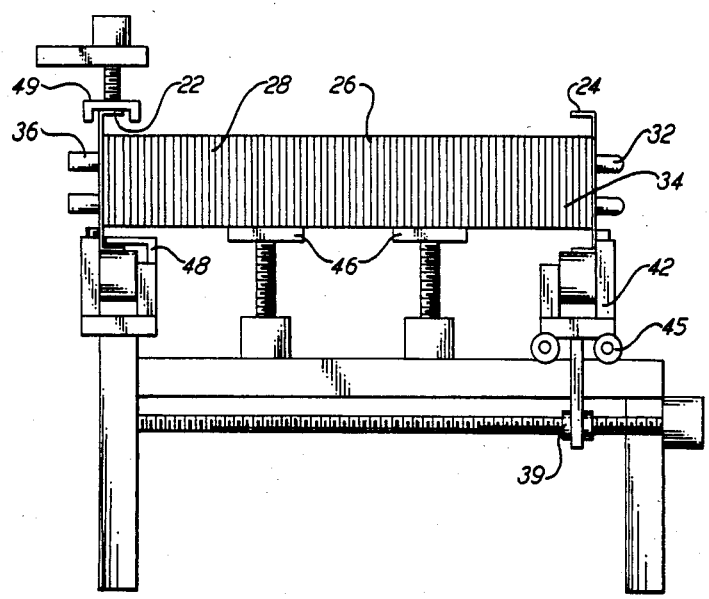
FIG. 4 is a side elevational view of an expanding station illustrated in FIG. 3 showing the long coil unit leveled in preparation for tension expansion.

As illustrated in FIGS. 2-4 the previously laced plate fin heat exchanger 20 is indexed into the expander station 12 by index means 37 with the tube sheets 22, 24 positioned directly on said rollers 38—38. However, the rollers 38 within the expander station 12 and supporting the bottom tube sheet 24 are further supported on the laterally adjustable carriage 42. The carriage 42 is carried on rail 44 by wheels 45 and is driven by drive means, for example a linear drive screw. The carriage 42 functions to adjust the distance between rollers for different heat exchanger lengths or to compress the fins prior to expansion. During the movement of a heat exchanger 20, for example from a belling station to the expander station 12, as can be seen in FIG. 3, the heat exchangers are free to sag. As can be clearly seen in FIG. 4, however, once the heat exchanger is indexed into the expander station 12, jack means 46 are operated to raise the sagging plate fin heat exchanger to level the heat exchanger in order that it may be properly expanded.

Further, as the plate fin heat exchanger 20 is indexed into the expander station 12 the lower portion of top tube sheet 22 is supported in fixed clamp 48 and the upper portion of top tube sheet 22 is supported in movable clamp 49. The movable clamp 49 is adjustable in the vertical direction by known means, for example hydraulic operated screw, and coacts with fixed clamp 48 to hold the top tube sheet 22 during tension expansion of the hairpin tubes 28.

While a preferred embodiment of the present invention has been depicted and described, it will be appreciated by those skilled in the art that many modifications, substitutions, and changes may be made thereto without departing from the true spirit and scope of the invention.

What is claimed is:

1. An apparatus for supporting a partially formed heat exchanger at a station for performing a manufacturing operation on the heat exchanger, the heat exchanger having a plurality of apertured plate fins parallelly spaced between two apertured tube sheets and a plurality of tubes extending through the apertures in which the open ends of the tubes are horizontally disposed, and for moving the heat exchanger into and out of the station, the apparatus comprising:

a conveyor means having a pair of roller means in spaced apart side-by-side relation, each of the pair of roller means supporting one of the tube sheets and movable transverse to the length of the tubes so that a portion of the heat exchanger sagging below a horizontal plane passing through the uppermost surface of the roller means is free from contact with said conveyor means;

a carriage means positioned at the station for moving one of said pair of roller means axially to the length of the tubes within the station for varying the spaced apart distance between the pair of roller means;

a jacking means within the station positioned below the heat exchanger and movable in a vertical direction for matingly engaging with the sagging portion of the heat exchanger for leveling the heat exchanger during the manufacturing operation; and a clamping means for engaging a top portion of one tube sheet during the manufacturing operation.

2. The invention as set forth in claim 1 further including an indexing means for positioning the heat exchanger within the station for performing a manufacturing operation on the heat exchanger.

3. The invention as set forth in claim 2 wherein the station for performing a manufacturing operation is an expander station having a plurality of bullet rods for expanding the tube in a radial direction to lock the tubes against the fins and tube sheets.

4. A method for performing a manufacturing operation on a plate fin heat exchanger having a plurality of apertured plate fins parallelly spaced between two apertured tube sheets and a plurality of hairpin tubes extending through the apertures wherein the central portion of the heat exchanger between the tube sheets sag in the vertical direction when the tubes are in a horizontal plane, comprising the steps of:

positioning each of the tube sheets of a partially formed plate fin heat exchanger on a pair of spaced apart side-by-side roller conveyors for moving the heat exchanger into and out of the manufacturing station;

providing a carriage means for supporting one of the spaced apart roller conveyors for moving the one supported roller conveyor for varying the space between the roller conveyors;

providing a jacking means for leveling the central portion of the heat exchanger during the manufacturing operation; and acting on a tube sheet with a clamping means for preventing movement of the heat exchanger during the manufacturing operation.

5. The invention as set forth in claim 4 wherein the manufacturing operation is a tension expansion process further including the step of:

expanding the tubes with a plurality of bullet rods to lock the tubes against the fins and the tube sheets.

* * * * *